Patented Sept. 8, 1925.

1,552,795

UNITED STATES PATENT OFFICE.

HANS T. CLARKE, OF ROCHESTER, NEW YORK, ASSIGNOR TO EASTMAN KODAK COMPANY, OF ROCHESTER, NEW YORK, A CORPORATION OF NEW YORK.

CELLULOSE-ESTER COMPOSITION.

No Drawing. Application filed June 16, 1924. Serial No. 720,167.

*To all whom it may concern:*

Be it known that I, HANS T. CLARKE, a subject of the King of Great Britain, residing at Rochester, in the county of Monroe and State of New York, have invented certain new and useful Improvements in Cellulose-Ester Compositions, of which the following is a full, clear, and exact specification.

This invention relates to a new composition of matter in which one or more cellulose esters, such as cellulose nitrate or cellulose acetate, or mixtures thereof, are mixed or combined with other substances so that the resulting product can be advantageously used in the plastic and analogous arts, such for instance as sheet or film manufacture and varnish manufacture.

One object of the invention is to provide a composition which may be made into permanently transparent, strong and flexible sheets or films of desired thinness, that are substantially waterproof, are unaffected by ordinary photographic fluids, and possess the desired properties of a support for light-sensitive photographic coatings. Another object of my invention is to provide a composition of matter capable of easy manipulation in the plastic and film-making, or varnish, or allied arts; which will not injure or be injured by the substances with which it is associated during manufacture, storage or use. Another object of my invention is to provide films of the nature hereinabove stated. Further objects will hereinafter appear.

I have found that compositions which attain the above enumerated objects may be prepared by combining one or more cellulose esters with pentaerythritol tetracetate. This combining is more conveniently effected by the use of a common solvent which brings the ingredients to a colloidized condition. This condition they maintain in films from which the volatile solvent is largely evaporated.

My invention may be carried out in many different ways. I shall describe them by way of example, but it will be understood that my invention is not restricted to them, nor to the proportions given in them, except as indicated in the appended claims. In one form of my invention I may, for example, dissolve 100 parts of cellulose nitrate and from 1 to 50 parts (say 30 parts) of pentaerythritol tetracetate in 300 to 400 parts of a volatile solvent, such as acetone alone, or methyl alcohol alone, or a mixture of acetone and methyl alcohol, say in equal parts. The proportions throughout are all by weight. This yields a flowable composition adapted for the manufacture of sheets and films under customary conditions. Where more rapidly flowable solutions are desired, the volatile solvents may be increased and even diluents, such as benzol and ethyl alcohol, can be added in amounts which do not cause precipitation during use.

Moreover, substances of low volatility may be incorporated in the composition in order to govern the evaporation of the volatile solvents and to enhance the plasticity or flexibility of the finished films or other product. Thus, for example, I may incorporate in the hereinabove described formula from 10 to 40 parts of a higher alcohol, such as any of the butyl alcohols or amyl alcohols, or mixtures of them. Propyl alcohol is likewise usable.

Other substances which impart useful qualities to the film may be added to the hereinabove described flowable composition, such for example as triphenyl phosphate, tricresyl phosphate, camphor, and monochlornaphthalene. Where these added materials are not solvents of cellulose nitrate, the amount of them is kept low enough to prevent precipitation of the nitrocellulose, and in the case of the manufacture of transparent sheets or films the amount is kept low enough to prevent formation of hazy or opaque products.

In the above formula other esters of cellulose may be substituted in place of the nitrocellulose. For example, cellulose acetate, preferably the acetone-soluble variety may be used, or mixtures of cellulose nitrate and cellulose acetate in any proportion, say for instance equal parts of each, may be employed. Where cellulose acetate is present, the volatile solvent is preferably acetone.

The ingredients are of the commercial type sufficiently purified for the process of film manufacture so as to give compositions having the proper relative freedom from color. The preferred dopes described in the examples hereinabove, when flowed into sheets from which the volatile solvent evaporates sufficiently to set and cure the latter in the usual way, yields final sheets or films which are transparent, flexible and adapted to serve as supports for photographic coatings or emulsions.

Having thus described my invention, what I claim as new and desire to secure by Letters Patent is:

1. A composition of matter in a colloidized state, comprising a cellulose ester and pentaerythritol tetracetate.

2. A composition of matter in a colloidized state, comprising a cellulose ester, pentaerythritol tetracetate and a common solvent.

3. A flowable composition of matter comprising a cellulose ester, pentaerythritol tetracetate, a common volatile solvent and an organic body of low volatility which regulates the evaporation of said volatile solvent from said composition.

4. A composition of matter in a colloidized state, comprising cellulose nitrate and pentaerythritol tetracetate.

5. A composition of matter in a colloidized state, comprising cellulose nitrate, pentaerythritol tetracetate and a common solvent.

6. A flowable film-forming composition of matter, comprising 100 parts of cellulose nitrate, 1 to 50 parts of pentaerythritol tetracetate and more than 300 parts of a volatile solvent liquid in which the two first named ingredients are soluble.

7. As an article of manufacture, a sheet of cellulose ester containing pentaerythritol tetracetate.

8. As an article of manufacture, a transparent, flexible sheet comprising cellulose nitrate and pentaerythritol tetracetate.

9. As an article of manufacture, a flexible, transparent sheet, comprising cellulose nitrate, pentaerythritol tetracetate and a monohydroxy aliphatic alcohol containing more than 2 and less than 6 carbon atoms.

Signed at Rochester, New York, this 10th day of June, 1924.

HANS T. CLARKE.